US012652092B2

(12) United States Patent
Xi

(10) Patent No.: US 12,652,092 B2
(45) Date of Patent: Jun. 9, 2026

(54) METHOD FOR REPORTING INFORMATION, METHOD FOR INDICATING INFORMATION, TERMINAL DEVICE, AND NETWORK DEVICE

(71) Applicant: VIVO MOBILE COMMUNICATION CO., LTD., Guangdong (CN)

(72) Inventor: Wei Xi, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 378 days.

(21) Appl. No.: 17/836,137

(22) Filed: Jun. 9, 2022

(65) Prior Publication Data

US 2022/0302980 A1    Sep. 22, 2022

Related U.S. Application Data

(63) Continuation of application No. PCT/CN2020/139111, filed on Dec. 24, 2020.

(30) Foreign Application Priority Data

Dec. 31, 2019    (CN) .......................... 201911411013.7

(51) Int. Cl.
    *H04B 7/06*        (2006.01)
    *H04B 7/0456*      (2017.01)
    *H04L 5/14*        (2006.01)
(52) U.S. Cl.
    CPC ........... *H04B 7/0626* (2013.01); *H04B 7/046* (2013.01); *H04L 5/14* (2013.01)
(58) Field of Classification Search
    CPC .... H04B 7/0626; H04B 7/046; H04B 7/0615; H04B 7/0658; H04B 7/0456; H04L 5/14;
    (Continued)

(56) References Cited

U.S. PATENT DOCUMENTS 5,648,913 A *    7/1997    Bennett ................. G06F 30/392
                                                         716/121
2003/0104831 A1 *   6/2003    Razavilar .............. H04L 1/0021
                                                         455/69
(Continued)

FOREIGN PATENT DOCUMENTS

CN        107733481 A        2/2018
CN        107786250 A        3/2018
(Continued)

OTHER PUBLICATIONS

Futurewei, "Rel-17 Work Scope on NR Mimo", 3rd Generation Partnership Project (3GPP), RP-191869, Sep. 16-20, 2019, Newport Beach, USA.

(Continued)

*Primary Examiner* — Sujoy K Kundu
*Assistant Examiner* — Raul Rivas
(74) *Attorney, Agent, or Firm* — Price Heneveld LLP

(57)        ABSTRACT

A method for reporting information, a method for indicating information, a terminal device, and a network device are disclosed. The method for reporting information is applied to a terminal device and includes: receiving indication information from a network device, where the indication information is used to indicate the terminal device to report phase information of at least one target path corresponding to a downlink channel; and reporting the phase information of at least one target path to the network device according to the indication information.

15 Claims, 3 Drawing Sheets

Receive indication information from a network device, where the indication information is used to indicate a terminal device to report phase information of at least one target path corresponding to a downlink channel ∿ 202

Report the phase information of the at least one target path to the network device according to the indication information ∿ 204

(58) Field of Classification Search
CPC . H04L 25/0212; H04L 25/0224; H04L 5/005; H04L 5/0091; H04L 5/0051; H04W 72/1268; H04W 72/21; H04W 72/23
See application file for complete search history.

(56) References Cited

U.S. PATENT DOCUMENTS

| | | | |
|---|---|---|---|
| 2013/0201912 A1 | 8/2013 | Sheng et al. | |
| 2014/0198755 A1* | 7/2014 | Sundarraman | H04W 56/0055 |
| | | | 370/329 |
| 2015/0257114 A1* | 9/2015 | Sawada | H04W 48/16 |
| | | | 370/350 |
| 2019/0028220 A1* | 1/2019 | Kecicioglu | H04W 56/0015 |
| 2019/0094023 A1* | 3/2019 | Diem | G01C 17/38 |
| 2019/0312668 A1* | 10/2019 | Park | H04L 5/0057 |
| 2020/0119779 A1* | 4/2020 | Nguyen | H04L 5/0053 |
| 2020/0280880 A1* | 9/2020 | Lin | H04W 72/27 |
| 2020/0280929 A1 | 9/2020 | Chen et al. | |

| | | | |
|---|---|---|---|
| 2021/0013954 A1 | 1/2021 | Zhao et al. | |
| 2021/0029673 A1 | 1/2021 | Zhang | |
| 2021/0184742 A1 | 6/2021 | Gao et al. | |

FOREIGN PATENT DOCUMENTS

| | | |
|---|---|---|
| CN | 108833061 A | 11/2018 |
| CN | 109039962 A | 12/2018 |
| WO | 2011146606 A1 | 11/2011 |
| WO | 2018215052 A1 | 11/2018 |
| WO | 2019100296 A1 | 5/2019 |
| WO | 2019129006 A1 | 7/2019 |
| WO | 2019179463 A1 | 9/2019 |

OTHER PUBLICATIONS

Second Indian Office Action for Indian Patent Application No. 202227030606 dated Nov. 21, 2025, 3 pages.

* cited by examiner

Transmit indication information to a terminal device, where the indication information is used to indicate the terminal device to report phase information of at least one target path corresponding to a downlink channel $\sim$ 102

FIG. 1

Receive indication information from a network device, where the indication information is used to indicate a terminal device to report phase information of at least one target path corresponding to a downlink channel $\sim$ 202

Report the phase information of the at least one target path to the network device according to the indication information $\sim$ 204

FIG. 2

$\sim$ 31

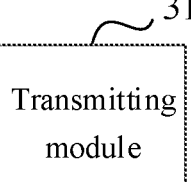

Transmitting module

FIG. 3

METHOD FOR REPORTING INFORMATION, METHOD FOR INDICATING INFORMATION, TERMINAL DEVICE, AND NETWORK DEVICE

CROSS-REFERENCE TO RELATED APPLICATIONS

This application is a continuation application of PCT International Application No. PCT/CN2020/139111 filed on Dec. 24, 2020, which claims priority to Chinese Patent Application No. 201911411013.7, filed in China on Dec. 31, 2019, which are incorporated herein by reference in their entireties.

TECHNICAL FIELD

The present invention relates to the field of communications, and in particular, to a method for reporting information, a method for indicating information, a terminal device, and a network device.

BACKGROUND

When communicating with a network device, a terminal device may feed back channel state information (CSI) of a downlink channel to the network device, so that the network device can determine, based on the CSI fed back by the terminal device, a precoding matrix for downlink transmission and based on the precoding matrix, transmit data to the terminal device, thereby obtaining better link performance.

With the development of multi-antenna technology (MIMO, Multi-Input Multi-Output), communication between terminal devices and network devices is increasingly based on the multi-antenna technology. During the communication based on the multi-antenna technology, the terminal device also needs to feed back the CSI to the network device. To reduce resource overheads when the terminal device feeds back the CSI to the network device under MIMO, the terminal device usually feeds back the CSI to the network device in an implicit feedback manner. For example, the terminal device may transmit a sounding reference signal (SRS) to the network device, and the network device may determine, based on the SRS, uplink channel information, determine downlink channel information by using reciprocity between uplink and downlink channels, and then determine a precoding matrix for downlink transmission.

The channel reciprocity is present in time division duplex (TDD) and frequency division duplex (FDD) systems. In a TDD system, impulse responses of uplink and downlink channels are exactly the same, and such reciprocity may be called complete reciprocity. However, in an FDD system, such reciprocity is only partial reciprocity. To be specific, in angle domain, an angle of departure (AoD) of a downlink channel is equal to an angle of arrival (AoA, Angle of Departure) of an uplink channel, and in delay domain, the uplink and downlink channels have same multipath delay and multipath power. However, because the uplink and downlink channels in the FDD system are located at different carrier frequencies, wavelengths corresponding to uplink and downlink wireless transmissions are different, such that in the FDD system, the network device cannot effectively determine, based on the channel reciprocity, the precoding matrix for downlink transmission.

SUMMARY

According to a first aspect, a method for reporting information is provided, applied to a terminal device and including:

receiving indication information from a network device, where the indication information is used to indicate the terminal device to report phase information of at least one target path corresponding to a downlink channel; and reporting the phase information of the at least one target path to the network device according to the indication information.

According to a second aspect, a method for indicating information is provided, applied to a network device and including:

transmitting indication information to a terminal device, where the indication information is used to indicate the terminal device to report phase information of at least one target path corresponding to a downlink channel.

According to a third aspect, a terminal device is provided, where the terminal device includes:

a receiving module, configured to receive indication information from a network device, where the indication information is used to indicate the terminal device to report phase information of at least one target path corresponding to a downlink channel; and a reporting module, configured to report the phase information of the at least one target path to the network device according to the indication information.

According to a fourth aspect, a network device is provided, where the network device includes:

a transmitting module, configured to transmit indication information to a terminal device, where the indication information is used to indicate the terminal device to report phase information of at least one target path corresponding to a downlink channel.

According to a fifth aspect, a terminal device is provided, where the terminal device includes a processor, a memory, and a computer program stored in the memory and capable of running on the processor, and when the computer program is executed by the processor, the steps of the method according to the first aspect are implemented.

According to a sixth aspect, a network device is provided, where the network device includes a processor, a memory, and a computer program stored in the memory and capable of running on the processor, and when the computer program is executed by the processor, the steps of the method according to the second aspect are implemented.

According to a seventh aspect, a computer-readable storage medium is provided, where the computer-readable storage medium stores a computer program, and when the computer program is executed by a processor, the steps of the method according to the first aspect are implemented.

According to an eighth aspect, a computer-readable storage medium is provided, where the computer-readable storage medium stores a computer program, and when the computer program is executed by a processor, the steps of the method according to the second aspect are implemented.

BRIEF DESCRIPTION OF DRAWINGS

The drawings described herein are used to provide a further understanding about the present invention, and constitute a part of the present invention. Exemplary embodiments of the present invention and descriptions thereof are used to explain the present invention, but do not constitute any inappropriate limitation on the present invention.

FIG. 1 is a schematic flowchart of an embodiment of a method for indicating information according to the present invention;

FIG. 2 is a schematic flowchart of an embodiment of a method for reporting information according to the present invention;

FIG. 3 is a schematic structural diagram of an embodiment of a network device according to the present invention;

DETAILED DESCRIPTION

Figure 4:
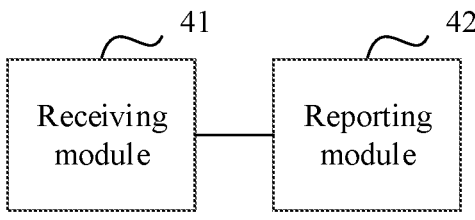
FIG. 4 is a schematic structural diagram of an embodiment of a terminal device according to the present invention.

When communication is being performed between a terminal device and a network device based on a multi-antenna technology, the terminal device may feed back CSI to the network device based on reciprocity between uplink and downlink channels, so that the network device determines a precoding matrix for downlink transmission. Specifically, the terminal device may transmit a sounding reference signal (SRS) to the network device, and the network device may determine, based on the SRS, uplink channel information, determine downlink channel information by using the reciprocity between the uplink and downlink channels, and then determine the precoding matrix for downlink transmission.

However, in an FDD system, the reciprocity between uplink and downlink channels is only partial reciprocity. To be specific, in angle domain, an angle of departure of a downlink channel is equal to an angle of arrival of an uplink channel, and in delay domain, the uplink and downlink channels have same multipath delay and multipath power, but wavelengths corresponding to uplink and downlink wireless transmissions are different because the uplink and downlink channels in the FDD system are located at different carrier frequencies. As a result, the terminal device cannot effectively feed back CSI to the network device based on the channel reciprocity.

In practical FDD systems, it is found through research that in delay domain, for any path, uplink and downlink transmissions have a same distance but different wavelengths, so that phases of the path are different in impulse responses of uplink and downlink channels. In this way, if the network device knows phase information of the path corresponding to the downlink channel, then the network device can determine a precoding matrix for downlink transmission, based on the partial reciprocity between the uplink and downlink channels and the phase information.

In view of this, embodiments of the present invention provide a method for reporting information, a method for indicating information, a terminal device, and a network device, where the network device may indicate the terminal device to report phase information of at least one target path corresponding to a downlink channel, and after receiving indication information, the terminal device may report the phase information of the at least one target path to the network device according to the indication information. In this way, by indicating the terminal device to report the phase information of the specified path corresponding to the downlink channel, the network device may obtain, based on channel partial reciprocity, an impulse response of an uplink channel, and the phase information reported by the terminal device, an impulse response of the downlink channel, so that a downlink transmission throughput can be improved with optimization of downlink precoding design.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Technical solutions of the present invention may be applied to various communications systems, such as: a long term evolution (LTE) system/long term evolution advanced (LTE-A) system, an LTE frequency division duplex (FDD) system, an LTE time division duplex (TDD) system, a universal mobile telecommunications system (UMTS), a worldwide interoperability for microwave access (WiMAX) communications system, a 5G system or in other words, a new radio (NR) system, and the like.

The terminal device may be understood as user equipment (UE) or referred to as a mobile terminal, mobile user equipment, or the like, and may communicate with one or more core networks via a radio access network (for example, RAN). The terminal device may be a mobile terminal, for example, a mobile phone (or referred to as a "cellular" phone) and a computer provided with a mobile terminal. For example, the user equipment may be a portable, pocket-sized, handheld, computer built-in, or in-vehicle mobile apparatus. Alternatively, the terminal device may be an aircraft such as an unmanned aerial vehicle or a flying machine. These devices exchange voice and/or data with the radio access network.

The network device can be understood as a core network, or may be understood as a base station. The base station may be a base transceiver station (BTS) in GSM or CDMA, or may be a NodeB in WCDMA, or may be an evolved NodeB (eNB or e-Node B) in LTE, a 5G base station (gNB), or a network-side device in a later evolved communications system, which is not limited in the present invention. In the following embodiments, the gNB is used as an example for description.

The following describes the technical solutions provided in the embodiments of the present invention by using a frequency division duplex (FDD) system as an application scenario with reference to the accompanying drawings. It should be noted that the methods provided in the embodiments of the present invention are also applicable to other systems with channel partial reciprocity.

FIG. 1 is a schematic flowchart of an embodiment of a method for indicating information according to the present invention. The method may be performed by an electronic device, such as a network device. In other words, the method for indicating information may be performed by software or hardware installed in the network device. As shown in FIG. 1, the method for indicating information may include the following steps.

S102: Transmit indication information to a terminal device, where the indication information is used to indicate the terminal device to report phase information of at least one target path corresponding to a downlink channel.

In an FDD system, in a scenario in which communication is being performed between a terminal device and a network device based on a multi-antenna technology (MIMO, Multi-Input Multi-Output), the network device may transmit indication information to the terminal device before transmitting downlink data to the terminal device. The indication information is used to indicate the terminal device to report phase information of at least one target path corresponding to a downlink channel.

In this embodiment, the at least one target path corresponding to the downlink channel may meet at least one of the following conditions.

Condition 1: The at least one target path includes no reference path.

The reference path may be one of a plurality of paths corresponding to an uplink channel or the downlink channel. Optionally, the reference path may be a path with a greatest strength among the plurality of paths corresponding to the uplink channel or the downlink channel. In this embodiment, the reference path may be used by the network device to determine a relative delay of the at least one target path.

Condition 2: The at least one target path includes top N paths with the greatest strength(s) among a plurality of paths corresponding to the downlink channel.

N is an integer greater than 0, and specifically may be a protocol-defined value, or may be pre-configured by the network device. The strength of each of the top N paths is greater than a strength of any one of the rest of the plurality of paths corresponding to the downlink channel.

That the at least one target path meets the conditions 1 and 2 means that the at least one target path includes the top N paths with the greatest strength(s) among the plurality of paths corresponding to the downlink channel except the reference path.

Condition 3: The at least one target path includes path(s) with a strength greater than or equal to a preset threshold among the plurality of paths corresponding to the downlink channel.

The preset threshold may be a protocol-defined value or pre-configured by the network device.

That the at least one target path meets the conditions 1 and 3 means that the at least one target path includes path(s) with a strength greater than or equal to a preset threshold among the plurality of paths corresponding to the downlink channel except the reference path.

That the at least one target path meets the conditions 2 and 3 means that the at least one target path includes an intersection between top N paths with the greatest strength(s) among the plurality of paths corresponding to the downlink channel and path(s) with a strength greater than or equal to a preset threshold, or a collection thereof.

That the at least one target path meets the conditions 1, 2, and 3 means that the at least one target path includes an intersection between top N paths with the greatest strength(s) among the plurality of paths corresponding to the downlink channel except the reference path and path(s) with a strength greater than or equal to a preset threshold, or a collection thereof.

In this embodiment, in order to facilitate the terminal device to locate the at least one target path and then report the phase information of the at least one target path, the indication information delivered by the network device may include the relative delay of the at least one target path, where the relative delay of the at least one target path may be determined by the network device before the indication information is transmitted to the terminal device.

Specifically, before transmitting the indication information to the terminal device, the network device may use at least one of radio resource control (RRC) signaling, media access control (MAC) control element (CE) signaling, and downlink control information (DCI) to trigger the terminal device to transmit a sounding reference signal (SRS) to the network device. After receiving the signaling from the network device, the terminal device may transmit the SRS to the network device, where the SRS transmitted by the terminal device may be precoded and then transmitted by the terminal device, or may be precoded without use of the terminal device.

After receiving the SRS transmitted by the terminal device, the network device may estimate an impulse response of an uplink channel based on the SRS. The impulse response of the uplink channel may include one or more paths, which means that the uplink channel may correspond to one or more paths. In this embodiment, the description may be made by using an example in which the impulse response of the uplink channel includes a plurality of paths.

After obtaining the impulse response of the uplink channel, the network device may determine, based on the impulse response of the uplink channel, the relative delay of the at least one target path corresponding to the downlink channel. Because in the FDD system, the uplink and downlink channels have same multipath delay and multipath power, the relative delay of the at least one target path corresponding to the downlink channel is a relative delay of the at least one target path corresponding to the uplink channel. In this way, that the network device determines, based on the impulse response of the uplink channel, the relative delay of the at least one target path corresponding to the downlink channel may include the following steps.

Firstly, an impulse response component of the at least one target path is determined based on the impulse response of the uplink channel.

Specifically, the network device may determine, based on the impulse response of the uplink channel, an impulse response component of the at least one target path corresponding to the uplink channel. The impulse response component of one path may be expressed as a complex number, and based on the impulse response component of one path, a delay (a delay obtained based on a timing standard of the network device, that is, the delay is a delay with respect to this timing standard) and strength of the path may be determined.

Secondly, a delay of the at least one target path is determined based on the impulse response component of the at least one target path.

The delay of the at least one target path determined in this step can be understood as a delay of the at least one target path corresponding to the uplink channel, and the delay can be understood as a delay with respect to the timing standard of the network device, where a delay of one target path may be determined based on an impulse response component of the one target path.

Lastly, the relative delay of the at least one target path is determined based on a delay of the reference path corresponding to the uplink channel and the delay of the at least one target path.

The reference path corresponding to the uplink channel may be configured by the network device, and specifically may be the same as the reference path corresponding to the downlink channel, so that the terminal device and the network device may have a unified delay standard. Optionally, the reference path corresponding to the uplink channel may be a path with a greatest strength among the plurality of paths corresponding to the uplink channel. In this embodiment, the delay of the reference path corresponding to the uplink channel may be regarded as 0, and the phase may also be regarded as 0.

In this embodiment, the relative delay of the at least one target path that is determined by the network device based on the delay of the reference path and the delay of the at least one target path may include at least one of the following cases.

Case 1: a relative delay determined based on a bitmap and a location of the reference path in the bitmap.

Specifically, the network device may use the bitmap with a set length to represent at least one target path and a reference path, and indicate a location of the reference path in the bitmap. In this way, the relative delay of the at least one target path with respect to the reference path may be determined based on the bitmap and the location of the reference path in the bitmap.

For example, it is assumed that: the length of the bitmap is 32, a total number of target paths and reference paths is 4, bits corresponding to the target paths and the reference paths in the bitmap are 1, other bits are 0, and the network device indicates that the location of the reference path in the bitmap is 01, that is, the reference path is a path corresponding to the second bit of the four 1s in the bitmap, then:

a relative delay of a first target path (corresponding to the first 1 in the bitmap) with respect to the reference path may be denoted as $-N_0-1$, where $N_0$ is the number of bits between a bit (with a value being 1) corresponding to the first target path and a bit (with a value being 1) corresponding to the reference path;

a relative delay of a second target path (corresponding to the third 1 in the bitmap) with respect to the reference path may be denoted as $N_1+1$, where $N_1$ is the number of bits between a bit (with a value being 1) corresponding to the second target path and the bit (with a value being 1) corresponding to the reference path; and a relative delay of a third target path (corresponding to the fourth 1 in the bitmap) with respect to the reference path may be denoted as $N_3+1$, where $N_3$ is the number of bits between a bit (with a value being 1) corresponding to the third target path and the bit (with a value being 1) corresponding to the reference path.

Case 2: relative delays of a start path and an end path of the at least one target path with respect to the reference path.

The start path can be understood as a target path ranked first in time domain in the at least one target path, and the end path can be understood as a target path ranked last in time domain in the at least one target path, where the number of the at least one target path is greater than or equal to 2.

In a case that a delay of the start path and a delay of the end path are known, delays of the paths within the range (that is, the delays of other target paths) may be obtained. Therefore, when the relative delay of the at least one target path is to be determined herein, only the relative delay of the start path with respect to the reference path and the relative delay of the end path with respect to the reference path may be determined.

Case 3: a relative delay of the at least one target path with respect to the reference path.

Specifically, a relative delay of each target path with respect to the reference path may be calculated separately based on the delay of at least one target path and the delay of the reference path.

In this embodiment, the relative delay of the at least one target path with respect to the reference path may be denoted as $[n_1, n_2 \ldots n_N]$, where N is a total number of target paths.

If $n_k>0$ (k=1, 2, . . . , N), it means that a delay of the k-th target path is greater than that of the reference path, and if $n_k<0$, it means that the delay of the k-th target path is less than that of the reference path.

Case 4: a relative delay of a second path of the at least one target path with respect to a first path of the at least one target path.

Specifically, the network device may determine, based on a delay of a target path at a first location of the at least one target path and the delay of the reference path, a relative delay of the target path with respect to the reference path. For a target path at a second location, a relative delay of the target path with respect to the target path at the first location may be determined, for a target path at a third location, a relative delay of the target path with respect to the target path at the second location may be determined, and so on, until a relative delay of a target path at a last location with respect to a target path at a previous location of the last target path is determined, and then the relative delay of the at least one target path is obtained.

To be specific, the network device may determine a relative delay of a second path of the at least one target path with respect to a first path of the at least one target path, where the first path and the second path are two adjacent paths of the at least one target path, and in a case that the first path is a first target path at a first location, a relative delay of the first path is a delay with respect to the reference path. A location of at least one target path may be a time domain location of the at least one target path, which is not specifically limited herein.

In this embodiment, a relative delay of each target path with respect to its previous target path may be denoted as $[m_1, m_2, \ldots, m_N]$, where N is a total number of target paths, $m_1$ is a relative delay of a first target path at a first location with respect to the reference path, $m_1$ is equal to $n_1$, $m_k$ (k=2, N) is a relative delay of a k-th target path at a k-th location with respect to a (k−1)-th target path at a (k−1)-th location, and $m_k$ is equal to $n_k-n_{k-1}$.

After determining the relative delay of the at least one target path corresponding to the downlink channel, the network device may transmit indication information to the terminal device, where the indication information may include the relative delay of the at least one target path.

The network device may transmit the indication information to the terminal device by at least one of the following: transmitting RRC signaling to the terminal device, the RRC signaling including the indication information; transmitting MAC-CE signaling to the terminal device, the MAC-CE signaling including the indication information; and transmitting DCI to the terminal device, the DCI including the indication information.

For example, when the network device transmits the indication information to the terminal device by using the RRC signaling and DCI, assuming that the indication information includes a relative delay of a start path in at least one target path with respect to the reference path and a delay of an end path of the at least one target path with respect to the reference path, the network device may add a plurality of relative delays of the start path and a plurality of relative delays of the end path to the RRC signaling, and indicate in the DCI which one of the plurality of relative delays of the start path carried in the RRC signaling is valid, and which one of the plurality of relative delays of the end path is valid.

After the network device transmits the indication information to the terminal device, the terminal device may report phase information of the at least one target path to the network device according to the indication information. For a specific implementation, reference may be made to content recorded in the embodiment shown in FIG. 2, and details are not described herein again.

After receiving the phase information of the at least one target path corresponding to the downlink channel reported by the terminal device, the network device may obtain, based on partial reciprocity between the downlink and uplink channels, the phase information, and an impulse response of the uplink channel, an impulse response of the downlink channel.

In the embodiments of the present invention, the network device may indicate the terminal device to report phase information of at least one target path corresponding to a downlink channel, and after receiving indication information, the terminal device may report the phase information of the at least one target path to the network device according to the indication information. In this way, by indicating the terminal device to report the phase information of the specified path corresponding to the downlink channel, the network device may obtain, based on channel partial reciprocity, an impulse response of an uplink channel, and the phase information reported by the terminal device, an impulse response of the downlink channel, so that a downlink transmission throughput can be improved with optimization of downlink precoding design.

FIG. 2 is a schematic flowchart of an embodiment of a method for reporting information according to the present invention. The method may be performed by an electronic device, such as a terminal device. In other words, the method for reporting information may be performed by software or hardware installed in the terminal device. As shown in FIG. 2, the method for reporting information may include the following steps.

S202: Receive indication information from a network device, where the indication information is used to indicate the terminal device to report phase information of at least one target path corresponding to a downlink channel.

In an FDD system, in a scenario in which communication is being performed between a terminal device and a network device based on a multi-antenna technology, before transmitting downlink data to the terminal device, the network device may transmit indication information to the terminal device based on the method recorded in the embodiment shown in FIG. 1. The indication information is used to indicate the terminal device to report phase information of the at least one target path.

In this embodiment, the at least one target path may meet at least one of the following conditions: The at least one target path includes no reference path; the at least one target path includes top N paths with the greatest strength(s) among a plurality of paths corresponding to the downlink channel, where N is a positive integer, and N may be a protocol-defined value or pre-configured by the network device; and the at least one target path includes path(s) with a strength greater than or equal to a preset threshold among the plurality of paths corresponding to the downlink channel, where the preset threshold may be a protocol-defined value or pre-configured by the network device. For details, reference may be made to at least one target path recorded in the embodiment shown in FIG. 1, and the description is not repeated herein again.

After the network device transmits the foregoing indication information to the terminal device, the terminal device may receive the indication information. After that, the terminal device may perform S204.

S204: Report the phase information of the at least one target path to the network device according to the indication information.

In this embodiment, the indication information delivered by the network device may include a relative delay of the at least one target path, where the relative delay of the at least one target path may be determined by the network device based on the method recorded in the embodiment shown in FIG. 1, and the description is not repeated herein again After receiving the indication information and before reporting the phase information of the at least one target path to the network device, the terminal device may determine, based on an impulse response of the downlink channel and the relative delay of the at least one target path, the phase information of the at least one target path, and report, after obtaining the phase information of the at least one target path, the obtained phase information to the network device.

The impulse response of the downlink channel may be determined by the terminal device based on a channel state information reference signal (CSI-RS) transmitted by the network device, where a timing of transmitting the CSI-RS by the network device may be before the network device transmits the indication information to the terminal device, or may be after the network device transmits the indication information to the terminal device, which is not specifically limited herein.

When determining, based on the impulse response of the downlink channel and the relative delay of the at least one target path, the phase information of the at least one target path, the terminal device may perform the following steps.

1: Determine, based on a delay of a reference path corresponding to the downlink channel and the relative delay of the at least one target path, a delay of the at least one target path.

The delay of the at least one target path herein may be understood as the delay of the at least one target path with respect to a timing standard of the terminal device, that is, a delay obtained based on the timing standard of the terminal device. The reference path corresponding to the downlink channel may be the reference path recorded in the embodiment shown in FIG. 1, and the reference path is the same as a reference path corresponding to an uplink channel. Optionally, the reference path may be a path with a greatest strength among the plurality of paths corresponding to the downlink channel.

In this embodiment, when the terminal device determines the delay of the at least one target path, it is considered that the delay of the at least one target path recorded in the embodiment shown in FIG. 1 includes at least one of the four cases. Therefore, the following describes how the terminal device determines the delay of the at least one target path for the different cases.

Specifically, for Case 1 in the embodiment shown in FIG. 1, that is, for a relative delay determined based on a bitmap and a location of the reference path in the bitmap:

Specifically, because the network device uses the bitmap to represent the reference path and the target path, and indicates the location of the reference path in the bitmap, the terminal device may obtain, based on the bitmap and the location of the reference path in the bitmap, a delay of at least one target path. Taking the three target paths, one reference path, and the location 01 of the reference path in the bitmap that are recorded in the embodiment shown in FIG. 1 as an example, assuming that the delay of the reference path is x (optionally 0), then:

a delay of a first target path (corresponding to the first 1 in the bitmap) may be denoted as $x-N_0-1$, where $N_0$ is the number of bits between a bit (with a value being 1) corresponding to the first target path and a bit (with a value being 1) corresponding to the reference path;

a delay of a second target path (corresponding to the third 1 in the bitmap) may be denoted as $x+N_1+1$, where $N_1$ is the number of bits between a bit (with a value being 1) corresponding to the second target path and the bit (with a value being 1) corresponding to the reference path; and a delay of a third target path (corresponding to the fourth 1 in the bitmap) may be denoted as $x+N_3+1$, where $N_3$ is the number of bits between a bit (with a value being 1) corresponding to the third target path and the bit (with a value being 1) corresponding to the reference path.

For Case 2 in the embodiment shown in FIG. 1, that is, for relative delays of a start path and an end path of the at least one target path with respect to the reference path:

Specifically, a delay of the start path may be obtained based on the delay of the reference path and the relative delay of the start path with respect to the reference path, and a delay of the end path may be obtained based on the delay of the reference path and the relative delay of the end path with respect to the reference path. After the delay at a start location and the delay at an end location are obtained, delays of other target paths may be further obtained.

For Case 3 in the embodiment shown in FIG. 1, that is, for a relative delay of the at least one target path with respect to the reference path:

Specifically, assuming that a delay of the reference path is x (optionally 0), and that a relative delay of the at least one target path with respect to the reference path is $[n_1, n_2, \ldots, n_N]$, a delay of the at least one target path may be denoted as $[x+n_1, x+n_2 \ldots x+n_N]$.

For Case 4 in the embodiment shown in FIG. 1, that is, for a relative delay of a second path of the at least one target path with respect to a first path of the at least one target path:

Specifically, a delay of the first path may be determined based on the delay of the reference path and the relative delay of the first target path at a first location with respect to the reference path. Assuming that the delay of the reference path is x (optionally 0), the delay of the first target path is equal to a sum of x and the relative delay of the first target path.

After the delay of the first target path is obtained, a delay of the second target path may be determined, and the delay of the second target path is equal to a sum of the delay of the first target path and a relative delay of the second target path; after the delay of the second target path is obtained, a delay of a third target path may be determined, and the delay of the third target path is equal to a sum of the delay of the second target path and a relative delay of the third target path; and so on, until a delay of a last target path is determined. In this way, delays of all target paths may be obtained finally.

Optionally, in the foregoing Case 2 to Case 4, for any one of the at least one target path, if a delay of a target path is less than 1 or greater than an inverse discrete Fourier transform (IDFT) point $N_{IDFT}$ (the number of CSI-RSs that may be used to estimate an impulse response of an downlink channel), the delay of the target path still needs to be converted into a value by modulo the number of IDFT points $N_{IDFT}$, and the converted value is used as the delay of the target path. For example, if the delay of the target path is $x+n_i$, and $x+n_i$ is less than 1 or greater than $N_{IDFT}$, the delay of the target path should be a value of $x+n_i$ modulo the number of IDFT points $N_{IDFT}$, denoted as $x+n_i|N_{IDFT}$.

2: Determine, based on the delay of the at least one target path and the impulse response of the downlink channel, an impulse response component of a corresponding target path.

After determining the delay of the at least one target path, the terminal device may obtain a location of the at least one target path in the impulse response of the downlink channel, and may based on the impulse response of the downlink channel, further obtain the impulse response component of the corresponding target path.

3: Determine, based on the determined impulse response component, the phase information of the at least one target path.

In this embodiment, the phase information may include at least one of a phase and a phase difference, where the phase difference may be a phase difference between a target path and the reference path.

When the terminal device determines the phase information of the at least one target path: If the phase information includes the phase, the terminal device may determine, directly based on the impulse response component of the at least one target path, the phase of the at least one target path; if the phase information includes the phase difference, the terminal device may first determine, based on the impulse response component of the at least one target path, the phase of the at least one target path, and determine, based on the impulse response component of the reference path, the phase of the reference path; and determine, based on the phase of the at least one target path and the phase of the reference path, a phase difference of the at least one target path with respect to the reference path.

After determining the phase information of the at least one target path corresponding to the downlink channel, the terminal device may report the phase information of the at least one target path to the network device.

In this embodiment, optionally, before reporting the phase information of the at least one target path, the terminal device may quantize the phase information of the at least one target path to obtain quantized phase information, where at least one bit may be obtained after the phase information of one target path is quantized. In this way, when reporting the phase information to the network device, the terminal device may report the quantized phase information of the at least one target path to the network device.

Optionally, when the terminal device quantizes the phase information of the at least one target path, if the number of target paths is greater than 1, the numbers of bits obtained after the phase information of different target paths is quantized may be the same, which means that the phase information of each target path is quantized to a fixed number of bits, where the fixed number of bits may be a protocol-defined value or may be pre-configured by the network device.

Alternatively, in a case that the number of target paths is greater than 1, the numbers of bits obtained after the phase information of different target paths is quantized may alternatively be different, where the number of bits obtained after phase information of a first target paths is quantized is greater than the number of bits obtained after phase information of a second target path is quantized, and a strength of the first target path is greater than a strength of the second target path. In other words, the phase information of the target paths with different strengths is quantized with different precisions. For a target path with a greater strength, the number of bits obtained after the phase information of the target path is quantized is greater.

In this embodiment, the terminal device reports the phase information of at least one target path to the network device, and the reporting method may be one of periodic reporting, aperiodic reporting, and semi-persistent reporting, which is not specifically limited herein.

A channel used by the terminal device for reporting the phase information of at least one target path may be at least one of a physical uplink control channel (PUCCH) and a physical uplink shared channel (PUSCH), which is not specifically limited herein. In other words, the terminal device can use a PUCCH for reporting the phase information of the at least one target path, or use a PUSCH for reporting the phase information of the at least one target path.

After the terminal device reports the phase information of the at least one target path corresponding to the downlink channel to the network device, the network device may obtain, based on partial reciprocity between the downlink and uplink channels, the phase information, and an impulse response of the uplink channel, an impulse response of the downlink channel.

In this embodiment of the present invention, the network device may indicate the terminal device to report phase information of at least one target path corresponding to a downlink channel, and after receiving indication information, the terminal device may report the phase information of the at least one target path to the network device according to the indication information. In this way, by indicating the terminal device to report the phase information of the specified path corresponding to the downlink channel, the network device may obtain, based on channel partial reciprocity, an impulse response of an uplink channel, and the phase information reported by the terminal device, an impulse response of the downlink channel, so that a downlink transmission throughput can be improved with optimization of downlink precoding design.

Specific embodiments of this specification are described above. Other embodiments fall within the scope of the appended claims. In some situations, the actions or steps recorded in the claims can be performed in a sequence different from that in the embodiments and a desired result can still be achieved. In addition, the process depicted in the accompanying drawings does not necessarily need a specific sequence or a consecutive sequence to achieve the desired result. In some implementations, multitasking and parallel processing may be feasible or may be advantageous.

FIG. 3 is a schematic structural diagram of an embodiment of a network device according to the present invention. The network device includes a transmitting module 31.

The transmitting module 31 is configured to transmit indication information to a terminal device, where the indication information is used to indicate the terminal device to report phase information of at least one target path corresponding to a downlink channel.

Optionally, the at least one target path meets at least one of the following conditions:
the at least one target path includes no reference path;
the at least one target path includes top N paths with the greatest strength(s) among a plurality of paths corresponding to the downlink channel, where N is a positive integer; and
the at least one target path includes at least one path with a strength greater than or equal to a preset threshold among the plurality of paths corresponding to the downlink channel.

Optionally, N is a protocol-defined value or pre-configured by the network device; and the preset threshold is a protocol-defined value or pre-configured by the network device.

Optionally, the indication information includes a relative delay of the at least one target path, where
before transmitting the indication information to the terminal device, the transmitting module 31 determines, based on a sounding reference signal SRS transmitted by the terminal device, an impulse response of an uplink channel; and determines, based on the impulse response of the uplink channel, the relative delay of the at least one target path.

That the transmitting module 31 determines, based on the impulse response of the uplink channel, the relative delay of the at least one target path includes:
determining, based on the impulse response, an impulse response component of the at least one target path;
determining, based on the impulse response component of the at least one target path, a delay of the at least one target path; and
determining, based on a delay of the reference path corresponding to the uplink channel and the delay of the at least one target path, the relative delay of the at least one target path.

Optionally, the reference path is a path with a greatest strength among a plurality of paths corresponding to the uplink channel.

Optionally, the relative delay of the at least one target path includes at least one of the following:
a relative delay determined based on a bitmap and a location of the reference path in the bitmap;
relative delays of a start path and an end path of the at least one target path with respect to the reference path;
a relative delay of the at least one target path with respect to the reference path; and
a relative delay of a second path of the at least one target path with respect to a first path of the at least one target path; where
the first path and the second path are two adjacent paths of the at least one target path, and in a case that the first path is a first target path, a relative delay of the first path is a delay with respect to the reference path.

Optionally, that the transmitting module 31 transmits indication information to a terminal device includes at least one of the following:
transmitting radio resource control RRC signaling to the terminal device, where the RRC signaling includes the indication information;
transmitting media access control element MAC-CE signaling to the terminal device, where the MAC-CE signaling includes the indication information; and
transmitting downlink control information DCI to the terminal device, where the DCI includes the indication information.

The network device provided in this embodiment of the present invention can implement the processes implemented by the network device in the method embodiment of FIG. 1. To avoid repetition, details are not described herein again.

In this embodiment of the present invention, the network device may indicate the terminal device to report phase information of at least one target path corresponding to a downlink channel, and after receiving indication information, the terminal device may report the phase information of the at least one target path to the network device according to the indication information. In this way, by indicating the terminal device to report the phase information of the specified path corresponding to the downlink channel, the network device may obtain, based on channel partial reciprocity, an impulse response of an uplink channel, and the phase information reported by the terminal device, an impulse response of the downlink channel, so that a downlink transmission throughput can be improved with optimization of downlink precoding design.

FIG. 4 is a schematic structural diagram of an embodiment of a terminal device according to the present invention. The terminal device includes a receiving module 41 and a reporting module 42.

The receiving module 41 receives indication information from a network device, where the indication information is used to indicate the terminal device to report phase information of at least one target path corresponding to a downlink channel.

The reporting module 42 reports the phase information of the at least one target path to the network device according to the indication information.

Optionally, the at least one target path meets at least one of the following conditions:

the at least one target path includes no reference path;

the at least one target path includes top N paths with the greatest strength(s) among a plurality of paths corresponding to the downlink channel, where N is a positive integer; and the at least one target path includes path(s) with a strength greater than or equal to a preset threshold among the plurality of paths corresponding to the downlink channel.

Optionally, N is a protocol-defined value or pre-configured by the network device; and the preset threshold is a protocol-defined value or pre-configured by the network device.

Optionally, the indication information includes a relative delay of the at least one target path, where before reporting the phase information of the at least one target path to the network device, the reporting module 42 determines, based on an impulse response of the downlink channel and the relative delay of the at least one target path, the phase information of the at least one target path, where the impulse response of the downlink channel is determined based on a channel state information reference signal CSI-RS delivered by the network device.

That the reporting module 42 determines, based on an impulse response of the downlink channel and the relative delay of the at least one target path, the phase information of the at least one target path includes:

determining, based on a delay of a reference path corresponding to the downlink channel and the relative delay of the at least one target path, a delay of the at least one target path, where the reference path corresponding to the downlink channel is the same as a reference path corresponding to an uplink channel;

determining, based on the delay of the at least one target path and the impulse response of the downlink channel, an impulse response component of a corresponding target path; and determining, based on the impulse response component, the phase information of the at least one target path.

Optionally, the phase information includes at least one of a phase and a phase difference.

Optionally, that the reporting module 42 determines, based on the impulse response component, the phase information of the at least one target path includes:

determining, based on the impulse response component, a phase of the at least one target path;

determining, based on an impulse response component of the reference path, a phase of the reference path; and determining, based on the phase of the at least one target path and the phase of the reference path, a phase difference between the at least one target path and the reference path.

Optionally, that the reporting module 42 reports the phase information of the at least one target path to the network device includes:

quantizing the phase information of the at least one target path to obtain quantized phase information; and reporting the quantized phase information to the network device.

Optionally, that the reporting module 42 reports the phase information of the at least one target path to the network device includes at least one of the following:

transmitting a physical uplink control channel PUCCH to the network device, where the PUCCH includes the phase information of the at least one target path; and transmitting a physical uplink shared channel PUSCH to the network device, where the PUSCH includes the phase information of the at least one target path.

Optionally, that the reporting module 42 reports the phase information of the at least one target path to the network device includes:

reporting the phase information of the at least one target path to the network device in a manner of periodic reporting, aperiodic reporting, or semi-persistent reporting.

The network device provided in this embodiment of the present invention can implement the processes implemented by the terminal device in the method embodiment of FIG. 2. To avoid repetition, details are not described herein again.

In this embodiment of the present invention, the network device may indicate the terminal device to report phase information of at least one target path corresponding to a downlink channel, and after receiving indication information, the terminal device may report the phase information of the at least one target path to the network device according to the indication information. In this way, by indicating the terminal device to report the phase information of the specified path corresponding to the downlink channel, the network device may obtain, based on channel partial reciprocity, an impulse response of an uplink channel, and the phase information reported by the terminal device, an impulse response of the downlink channel, so that a downlink transmission throughput can be improved with optimization of downlink precoding design.

Figure 5:
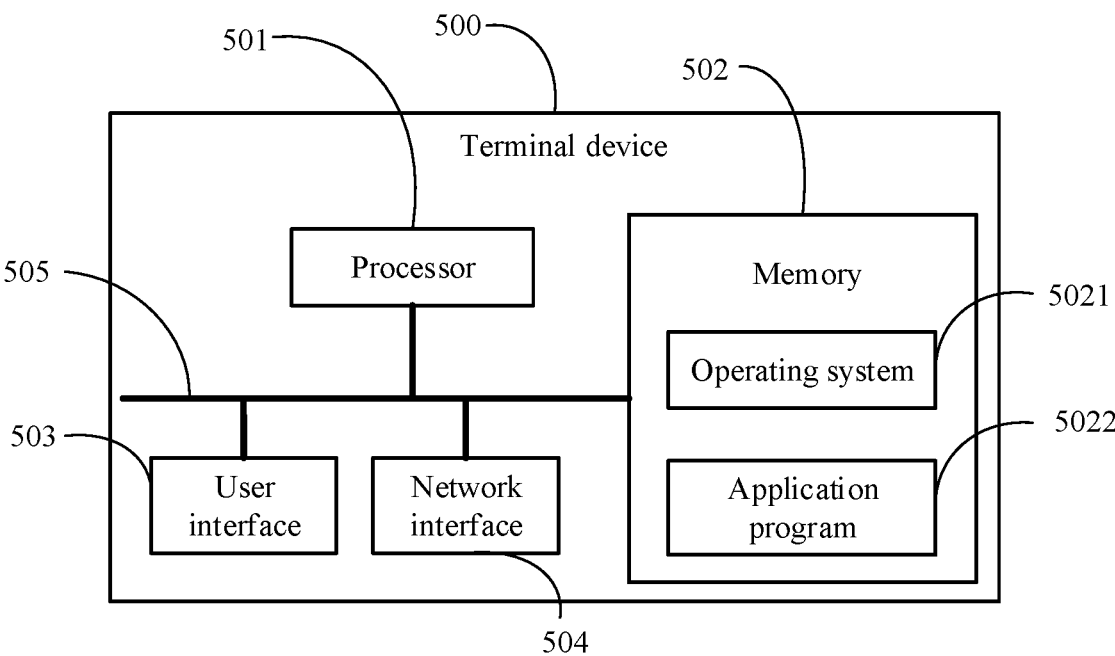
FIG. 5 is a schematic structural diagram of another embodiment of a terminal device according to the present invention.

FIG. 5 is a schematic structural diagram of another embodiment of a terminal device according to the present invention. The terminal device 500 shown in FIG. 5 includes at least one processor 501, a memory 502, at least one network interface 504, and a user interface 503. The components in the terminal device 500 are coupled together through a bus system 505. It can be understood that the bus system 505 is configured to implement connection and communication between these components. In addition to a data bus, the bus system 505 further includes a power bus, a control bus, and a status signal bus. However, for clarity of description, various buses are marked as the bus system 505 in FIG. 5.

The user interface 503 may include a display, a keyboard, a pointing device (for example, a mouse or a trackball (trackball)), a touch panel, or a touchscreen.

It can be understood that the memory 502 in this embodiment of the present invention may be a volatile memory or a non-volatile memory, or may include both a volatile memory and a non-volatile memory. The non-volatile memory may be a read-only memory (ROM), a programmable read only memory (PROM, Programmable ROM), an erasable programmable read-only memory (EPROM, Erasable PROM), and an electrically erasable programmable read-only memory (EEPROM, Electrically EPROM), or a flash memory. The volatile memory may be a random access memory (RAM), which is used as an external cache. As exemplary rather than restrictive description, many forms of RAM can be used, such as a static random access memory (SRAM, Static RAM), a dynamic random access memory (DRAM, Dynamic RAM), a synchronous dynamic random access memory (SDRAM, Synchronous DRAM), a double data rate synchronous dynamic random access memory (DDR SDRAM, Double Data Rate SDRAM), an enhanced synchronous dynamic random access memory (ESDRAM, Enhanced SDRAM), a synchronous link dynamic random access memory (SLDRAM, Synchlink DRAM), and a direct Rambus random access memory (DRRAM, Direct Rambus RAM). The memory 502 in a system and method described in this embodiment of the present invention is intended to include but is not limited to these and any other suitable types of memories.

In some embodiments, the memory 502 stores the following elements: executable modules or data structures, or a subset thereof, or an extended set thereof: an operating system 5021 and an application program 5022.

The operating system 5021 includes various system programs, such as a framework layer, a core library layer, and a driver layer, for implementing various basic services and processing hardware-based tasks. The application program 5022 includes various application programs, such as a media player and a browser, which are used to implement various application services. A program for implementing the method in the embodiments of the present invention may be included in the application program 5022.

In this embodiment of the present invention, the terminal device 500 further includes a computer program stored in the memory 502 and capable of running on the processor 501. When being executed by the processor 501, the computer program implements the following steps:

receiving indication information from a network device, where the indication information is used to indicate the terminal device to report phase information of at least one target path corresponding to a downlink channel; and reporting the phase information of the at least one target path to the network device according to the indication information.

The method disclosed in the foregoing embodiments of the present invention may be applied to the processor 501 or implemented by the processor 501. The processor 501 may be an integrated circuit chip, having a signal processing capability. During implementation, the steps of the foregoing method may be implemented by hardware integrated logic circuits in the processor 501 or instructions in the form of software. The foregoing processor 501 may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in the embodiments of the present invention. The general-purpose processor may be a microprocessor, or the processor may be any conventional processor or the like. Steps of the methods disclosed with reference to the embodiments of the present invention may be directly performed and completed by using a hardware decoding processor, or may be performed and completed by using a combination of hardware and a software module in a decoding processor. The software module may be located in a computer-readable storage medium mature in the art, such as a random access memory, a flash memory, a read-only memory, a programmable read-only memory or electrically erasable programmable memory, or a register. The computer-readable storage medium is located in the memory 502, and the processor 501 fetches information in the memory 502, and completes the steps of the foregoing method in combination with its hardware. Specifically, the computer-readable storage medium stores a computer program, and when the computer program is executed by the processor 501, the steps of the foregoing embodiment of the method for reporting information are implemented.

It can be understood that the embodiments described in the present invention may be implemented by hardware, software, firmware, middleware, microcode, or a combination thereof. For hardware implementation, a processing unit may be implemented in one or more application-specific integrated circuits (ASIC), digital signal processors (DSP), digital signal processing devices (DSPD, DSP Device), programmable logic devices (PLD), field programmable gate arrays (FPGA), general-purpose processors, controllers, microcontrollers, microprocessors, other electronic units used to implement the functions described in the present invention, or a combination thereof.

For software implementation, the technologies described in the embodiments of the present invention may be implemented by modules (for example, processes or functions) that perform the functions described in the embodiments of the present invention. Software code may be stored in the memory and executed by the processor. The memory may be implemented in the processor or outside the processor.

Optionally, the at least one target path meets at least one of the following conditions:

the at least one target path includes no reference path;

the at least one target path includes top N paths with the greatest strength(s) among a plurality of paths corresponding to the downlink channel, where N is a positive integer; and the at least one target path includes path(s) with a strength greater than or equal to a preset threshold among the plurality of paths corresponding to the downlink channel; where N is a protocol-defined value or pre-configured by the network device; and the preset threshold is a protocol-defined value or pre-configured by the network device.

The indication information includes a relative delay of the at least one target path, where before reporting the phase information of the at least one target path to the network device, the method further includes:

determining, based on an impulse response of the downlink channel and the relative delay of the at least one target path, the phase information of the at least one target path, where the impulse response of the downlink channel is determined based on a channel state information reference signal CSI-RS delivered by the network device.

The determining, based on an impulse response of the downlink channel and the relative delay of the at least one target path, the phase information of the at least one target path includes:

determining, based on a delay of a reference path corresponding to the downlink channel and the relative delay of the at least one target path, a delay of the at least one target path, where the reference path corresponding to the downlink channel is the same as a reference path corresponding to an uplink channel; determining, based on the delay of the at least one target path and an impulse response of the downlink channel, an impulse response component of a corresponding target path; and determining, based on the impulse response component, the phase information of the at least one target path.

The phase information includes at least one of a phase and a phase difference.

The determining, based on the impulse response component, the phase information of the at least one target path includes:

determining, based on the impulse response component, a phase of the at least one target path;

determining, based on an impulse response component of the reference path, a phase of the reference path; and determining, based on the phase of the at least one target path and the phase of the reference path, a phase difference between the at least one target path and the reference path.

The reporting the phase information of the at least one target path to the network device includes:

quantizing the phase information of the at least one target path to obtain quantized phase information; and reporting the quantized phase information to the network device.

The reporting the phase information of the at least one target path to the network device includes at least one of the following:

transmitting a physical uplink control channel PUCCH to the network device, where the PUCCH includes the phase information of the at least one target path; and transmitting a physical uplink shared channel PUSCH to the network device, where the PUSCH includes the phase information of the at least one target path.

The reporting the phase information of the at least one target path to the network device includes:

reporting the phase information of the at least one target path to the network device in a manner of periodic reporting, aperiodic reporting, or semi-persistent reporting.

The terminal device 500 can implement the processes implemented by the terminal device in the foregoing embodiments. To avoid repetition, details are not described herein again.

In this embodiment of the present invention, the network device may indicate the terminal device to report phase information of at least one target path corresponding to a downlink channel, and after receiving indication information, the terminal device may report the phase information of the at least one target path to the network device according to the indication information. In this way, by indicating the terminal device to report the phase information of the specified path corresponding to the downlink channel, the network device may obtain, based on channel partial reciprocity, an impulse response of an uplink channel, and the phase information reported by the terminal device, an impulse response of the downlink channel, so that a downlink transmission throughput can be improved with optimization of downlink precoding design.

Figure 6:
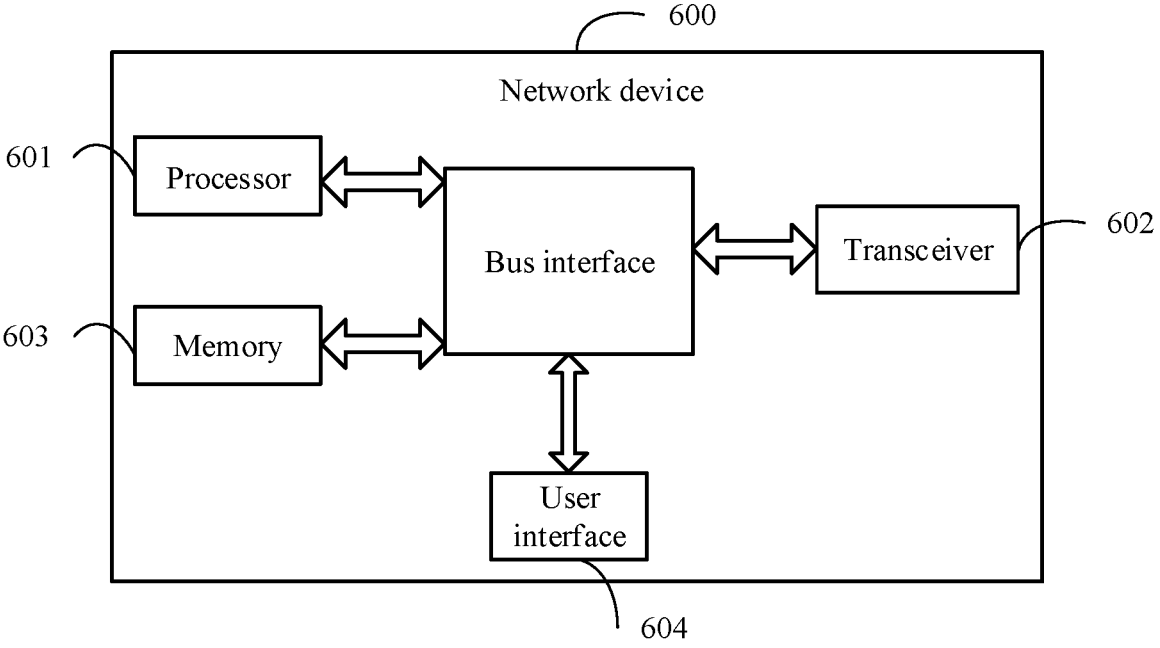
FIG. 6 is a schematic structural diagram of another embodiment of a network device according to the present invention.

FIG. 6 is a schematic structural diagram of another embodiment of a network device according to the present invention. As shown in FIG. 6, the network device 600 includes a processor 601, a transceiver 602, a memory 603, a user interface 604, and a bus interface.

In this embodiment of this invention, the network device 600 further includes a computer program stored in the memory 603 and capable of running on the processor 601, where when the computer program is executed by the processor 601, the following steps are implemented:

transmitting indication information to a terminal device, where the indication information is used to indicate the terminal device to report phase information of at least one target path corresponding to a downlink channel.

In FIG. 6, a bus architecture may include any quantity of interconnected buses and bridges, and specifically connect together various circuits of one or more processors represented by the processor 601 and a memory represented by the memory 603. The bus architecture may further interconnect various other circuits such as a peripheral device, a voltage regulator, and a power management circuit. These are all well known in the art, and therefore are not further described in this specification. The bus interface provides an interface. The transceiver 602 may be a plurality of components, including a transmitter and a receiver, and provides units for communicating with a variety of other apparatuses on a transmission medium. For different user equipment, the user interface 604 may also be an interface capable of externally or internally connecting a required device, and the connected device includes but is not limited to a keypad, a display, a speaker, a microphone, a joystick, and the like.

The processor 601 is responsible for management of the bus architecture and general processing, and the memory 603 may store data for use by the processor 601 when the processor 601 performs an operation.

In this embodiment of the present invention, the network device may indicate the terminal device to report phase information of at least one target path corresponding to a downlink channel, and after receiving indication information, the terminal device may report the phase information of the at least one target path to the network device according to the indication information. In this way, by indicating the terminal device to report the phase information of the specified path corresponding to the downlink channel, the network device may obtain, based on channel partial reciprocity, an impulse response of an uplink channel, and the phase information reported by the terminal device, an impulse response of the downlink channel, so that a downlink transmission throughput can be improved with optimization of downlink precoding design.

Optionally, the at least one target path meets at least one of the following conditions:

the at least one target path includes no reference path;

the at least one target path includes top N paths with the greatest strength(s) among a plurality of paths corresponding to the downlink channel, where N is a positive integer; and the at least one target path includes at least one path with a strength greater than or equal to a preset threshold among the plurality of paths corresponding to the downlink channel.

N is a protocol-defined value or pre-configured by the network device; and the preset threshold is a protocol-defined value or pre-configured by the network device.

The indication information includes a relative delay of the at least one target path, where before the indication information is transmitted to the terminal device, the following steps are further included:

determining, based on a sounding reference signal SRS transmitted by the terminal device, an impulse response of an uplink channel; and determining, based on the impulse response of the uplink channel, the relative delay of the at least one target path.

The determining, based on the impulse response of the uplink channel, the relative delay of the at least one target path includes:

determining, based on the impulse response, an impulse response component of the at least one target path;

determining, based on the impulse response component of the at least one target path, a delay of the at least one target path; and determining, based on a delay of the reference path corresponding to the uplink channel and the delay of the at least one target path, the relative delay of the at least one target path.

The reference path is a path with a greatest strength among a plurality of paths corresponding to the uplink channel.

The relative delay of the at least one target path includes at least one of the following:

a relative delay determined based on a bitmap and a location of the reference path in the bitmap;

relative delays of a start path and an end path of the at least one target path with respect to the reference path;

a relative delay of the at least one target path with respect to the reference path; and a relative delay of a second path of the at least one target path with respect to a first path of the at least one target path; where the first path and the second path are two adjacent paths of the at least one target path, and in a case that the first path is a first target path, a relative delay of the first path is a delay with respect to the reference path.

The transmitting indication information to the terminal device includes at least one of the following:

transmitting radio resource control RRC signaling to the terminal device, where the RRC signaling includes the indication information;

transmitting media access control element MAC-CE signaling to the terminal device, where the MAC-CE signaling includes the indication information; and transmitting downlink control information DCI to the terminal device, where the DCI includes the indication information.

An embodiment of the present invention further provides a computer-readable storage medium, where the computer-readable storage medium stores a computer program. When the computer program is executed by a processor, the processes of the foregoing embodiments of the method for reporting information or the method for indicating information are implemented, with the same technical effects achieved. To avoid repetition, details are not described herein again. Examples of the computer-readable storage medium include a non-temporary computer-readable storage medium, for example, a read-only memory (ROM), a random access memory (RAM), a magnetic disk, or an optical disk.

It should be noted that in this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially, or the part contributing to the prior art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of the present invention.

The embodiments of the present invention are described above with reference to the accompanying drawings, but the present invention is not limited to the embodiments. The embodiments are only illustrative rather than restrictive. Inspired by the present invention, a person of ordinary skill in the art can still derive a plurality of variations without departing from the essence of the present invention and the protection scope of the claims. All these variations shall fall within the protection of the present invention.

What is claimed is:

1. A method for reporting information, comprising:

receiving, by a terminal device, indication information from a network device, wherein the indication information is used to indicate the terminal device to report phase information of at least one target path corresponding to a downlink channel, and wherein the indication information indicates a relative delay of the at least one target path;

determining, by the terminal device based on the relative delay of the at least one target path, a location of the at least one target path in an impulse response of the downlink channel;

determining, by the terminal device based on the location of the at least one target path in the impulse response of the downlink channel, the phase information of the at least one target path; and reporting, by the terminal device, the phase information of the at least one target path to the network device;

wherein the impulse response of the downlink channel is determined based on a channel state information reference signal (CSI-RS) delivered by the network device;

wherein the determining, by the terminal device based on the relative delay of the at least one target path, a location of the at least one target path in an impulse response of the downlink channel comprises:

determining, by the terminal device based on a delay of a reference path corresponding to the downlink channel and the relative delay of the at least one target path, a delay of the at least one target path, wherein the reference path corresponding to the downlink channel is the same as a reference path corresponding to an uplink channel;

determining, by the terminal device based on the delay of the at least one target path, the location of the at least one target path in the impulse response of the downlink channel;

wherein the determining, by the terminal device based on the location of the at least one target path in the impulse response of the downlink channel, the phase information of the at least one target path comprises:

determining, by the terminal device based on the location of the at least one target path in the impulse response of the downlink channel and the impulse response of the downlink channel, an impulse response component of the at least one target path; and determining, based on the impulse response component, the phase information of the at least one target path.

2. The method according to claim 1, wherein the at least one target path meets at least one of the following conditions:

the at least one target path comprises no reference path;

the at least one target path comprises top N paths with the greatest strength(s) among a plurality of paths corresponding to the downlink channel, wherein N is a positive integer; or the at least one target path comprises path(s) with a strength greater than or equal to a preset threshold among the plurality of paths corresponding to the downlink channel.

3. The method according to claim 2, wherein N is a protocol-defined value or pre-configured by the network device; and the preset threshold is a protocol-defined value or pre-configured by the network device.

4. The method according to claim 1, wherein the reporting, by the terminal device, the phase information of the at least one target path to the network device comprises:

quantizing, by the terminal device, the phase information of the at least one target path to obtain quantized phase information; and reporting, by the terminal device, the quantized phase information to the network device.

5. The method according to claim 1, wherein the reporting, by the terminal device, the phase information of the at least one target path to the network device comprises at least one of the following:

transmitting, by the terminal device, a physical uplink control channel (PUCCH) to the network device, wherein the PUCCH comprises the phase information of the at least one target path; or transmitting, by the terminal device, a physical uplink shared channel (PUSCH) to the network device, wherein the PUSCH comprises the phase information of the at least one target path.

6. The method according to claim 1, wherein the reporting, by the terminal device, the phase information of the at least one target path to the network device comprises:

reporting, by the terminal device, the phase information of the at least one target path to the network device in a manner of periodic reporting, aperiodic reporting, or semi-persistent reporting.

7. A terminal device, comprising a processor, a memory, and a computer program stored in the memory and capable of running on the processor, wherein the computer program, when being executed by the processor, implements steps of:

receiving indication information from a network device, wherein the indication information is used to indicate the terminal device to report phase information of at least one target path corresponding to a downlink channel, and wherein the indication information indicates a relative delay of the at least one target path;

determining, based on the relative delay of the at least one target path, a location of the at least one target path in an impulse response of the downlink channel;

determining, based on the location of the at least one target path in the impulse response of the downlink channel, the phase information of the at least one target path; and reporting the phase information of the at least one target path to the network device according to the indication information;

wherein the impulse response of the downlink channel is determined based on a channel state information reference signal (CSI-RS) delivered by the network device;

wherein the determining, by the terminal device based on the relative delay of the at least one target path, a location of the at least one target path in an impulse response of the downlink channel comprises:

determining, by the terminal device based on a delay of a reference path corresponding to the downlink channel and the relative delay of the at least one target path, a delay of the at least one target path, wherein the reference path corresponding to the downlink channel is the same as a reference path corresponding to an uplink channel;

determining, by the terminal device based on the delay of the at least one target path, the location of the at least one target path in the impulse response of the downlink channel;

wherein the determining, by the terminal device based on the location of the at least one target path in the impulse response of the downlink channel, the phase information of the at least one target path comprises:

determining, by the terminal device based on the location of the at least one target path in the impulse response of the downlink channel and the impulse response of the downlink channel, an impulse response component of the at least one target path; and determining, based on the impulse response component, the phase information of the at least one target path.

8. The terminal device according to claim 7, wherein the at least one target path meets at least one of the following conditions:

the at least one target path comprises no reference path;

the at least one target path comprises top N paths with the greatest strength(s) among a plurality of paths corresponding to the downlink channel, wherein N is a positive integer; or the at least one target path comprises path(s) with a strength greater than or equal to a preset threshold among the plurality of paths corresponding to the downlink channel.

9. The terminal device according to claim 8, wherein N is a protocol-defined value or pre-configured by the network device; and the preset threshold is a protocol-defined value or pre-configured by the network device.

10. A network device, comprising a processor, a memory, and a computer program stored in the memory and capable of running on the processor, wherein the computer program, when being executed by the processor, implements a step of:

transmitting, to a terminal device, indication information which is used to indicate the terminal device to report phase information of at least one target path corresponding to a downlink channel, and indicates a relative delay of the at least one target path, to cause the terminal device to: determine, based on the relative delay of the at least one target path, a location of the at least one target path in an impulse response of the downlink channel, and determine, based on the location of the at least one target path in the impulse response of the downlink channel, the phase information of the at least one target path; and receiving the phase information of the at least one target path reported by the terminal device;

wherein the computer program, when being executed by the processor, further implements the following steps before the indication information is transmitted to the terminal device:

determining, based on a sounding reference signal (SRS) transmitted by the terminal device, an impulse response of an uplink channel; and determining, based on the impulse response of the uplink channel, the relative delay of the at least one target path;

wherein the step of determining, based on the impulse response of the uplink channel, the relative delay of the at least one target path comprises:

determining, based on the impulse response of the uplink channel, an impulse response component of the at least one target path;

determining, based on the impulse response component of the at least one target path, a delay of the at least one target path; and determining, based on a delay of a reference path corresponding to the uplink channel and the delay of the at least one target path, the relative delay of the at least one target path.

11. The network device according to claim 10, wherein the at least one target path meets at least one of the following conditions:

the at least one target path comprises no reference path;

the at least one target path comprises top N paths with the greatest strength(s) among a plurality of paths corresponding to the downlink channel, wherein N is a positive integer; or the at least one target path comprises path(s) with a strength greater than or equal to a preset threshold among the plurality of paths corresponding to the downlink channel.

12. The network device according to claim 11, wherein N is a protocol-defined value or pre-configured by the network device; and the preset threshold is a protocol-defined value or pre-configured by the network device.

13. The network device according to claim 10, wherein the reference path is a path with a greatest strength among a plurality of paths corresponding to the uplink channel.

14. The network device according to claim 10, wherein the relative delay of the at least one target path comprises at least one of the following:

a relative delay determined based on a bitmap and a location of the reference path in the bitmap;

relative delays of a start path and an end path of the at least one target path with respect to the reference path;

a relative delay of the at least one target path with respect to the reference path; or a relative delay of a second path of the at least one target path with respect to a first path of the at least one target path;

wherein the first path and the second path are two adjacent paths in the at least one target path, and in a case that the first path is a first target path, a relative delay of the first path is a delay with respect to the reference path.

15. The network device according to claim 10, wherein the step of transmitting indication information to a terminal device comprises at least one of the following:

transmitting radio resource control (RRC) signaling to the terminal device, wherein the RRC signaling comprises the indication information;

transmitting media access control element (MAC-CE) signaling to the terminal device, wherein the MAC-CE signaling comprises the indication information; or transmitting downlink control information (DCI) to the terminal device, wherein the DCI comprises the indication information.

\* \* \* \* \*